Patented July 29, 1924.

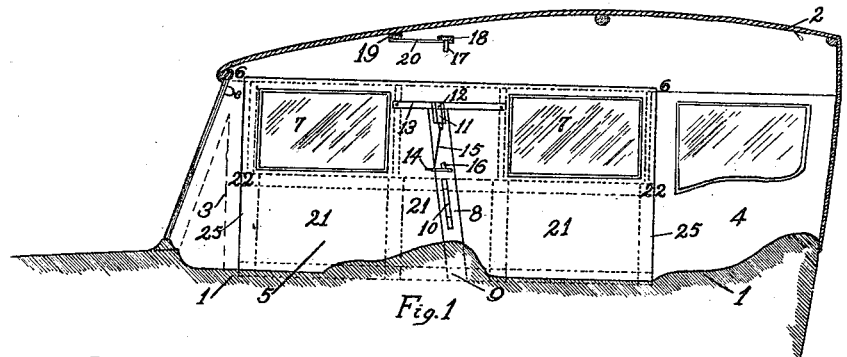

1,503,303

UNITED STATES PATENT OFFICE.

DAVID H. COLLIER, OF NEVINS TOWNSHIP, VIGO COUNTY, INDIANA.

VEHICLE SIDE CURTAIN.

Application filed June 7, 1922. Serial No. 566,484.

*To all whom it may concern:*

Be it known that I, DAVID H. COLLIER, a citizen of the United States of America, and a resident of Nevins Township, in the county of Vigo and State of Indiana, have invented certain new and useful Improvements in Vehicle Side Curtains, of which the following is a specification, reference being had therein to the accompanying drawing.

The main objects of this invention are to provide a vehicle side-curtain of improved form and construction which a passenger can operate without leaving his seat and which will form a substantially tight closure against rain, wind or dust, which will stay in position both when folded and when in use, will not flap in the wind and which will eliminate all buttons and fastening on the outside of the curtain, to provide a one-piece side-curtain extending from the wind-shield post to the fixed rear side-curtain, in which a single spring-operated catch secures the curtain in its operating or storage position, and to provide a complete curtain of this character that can be operated with one hand and that with one movement can be moved from storage to operating position or the reverse.

According to my invention the folding curtain embodying these improvements is made of any suitable material such as leather, imitation leather, oil-cloth, etc., in combination with a suitable reinforcing material such as wood, pressed steel, or the like; and of a length to reach from the rear curtain to the wind shield section.

My invention consists of the novel construction, combination and arrangement of parts hereinafter more particularly described and claimed, reference being had to the accompanying drawing, in which:

Figure 1 is a vertical sectional perspective inside view lengthwise of the vehicle showing the folding curtain in the operating position.

Figure 2 is a transverse sectional view of an automobile canopy top having my invention applied thereto showing one side in storage and one side in the operating position.

Figure 3 is a vertical sectional view through a curtain in the process of folding.

Figures 4, 5, 6, 7, 8 and 9 are detail views of parts of the curtain.

Figure 1 shows the upper part of the vehicle body 1, canopy top 2, windshield section 3, a rear curtain section 4, and a curtain 5 which completely fills the intervening space. The complete curtain 5 is shown in its operating position, as viewed from the inside of the vehicle. It is permanently attached to the canopy top 2 on the line 6, 6. The transparent sections 7, 7 may be of celluloid, glass or the like.

The curtain 5 is held in position by a spring stay member 8 which is set in a socket on the body 1 at 9 and is provided with a handle 10 and a spring latch 11 which engages in a catch 12 which is in turn made a fixed part of the curtain 5 by being permanently attached to the bar 13 mechanically integral with said curtain. Attached to the spring member 8 is a finger trip 14 which carries a link 15 which is attached to the spring latch 11. The finger trip 14 partially covers a mortised opening 16 which is located near the center of the spring member 8. In the same vertical plane with the mortised opening 16 there is secured below the canopy top two notched catches 17, 17 which are fastened to a bar 18 which is in turn attached to a canopy frame member 19 by means of supports 20, 20. The curtain structure has a horizontal division near its center, the lower section 21, 21 being opaque and the upper section 7, 7 being partly transparent. The two sections are joined by material that acts as a hinge and is located on the line 22, 22.

Whenever a curtain 5 is folded up against the canopy 2, the middle part of the stay 8 is sprung upward sufficiently for the corresponding catch 17 to enter the stay hole 16 where it is engaged by the trip member 14 until manually released in unfolding the curtain.

Figure 2 shows the body 1 with the sockets 24, 24 located at 9 and one curtain 5 in its operating position and the other curtain 5 folded and locked in its storage position.

Figure 3 shows one edge of canopy top 2 and curtain 5 at a point midway between operation and storage.

Figures 4 and 5 show two views of the top member 18 which is permanently secured to the canopy frame member 19.

Figures 6 and 7 show two views of spring member 8 with lip 23 which engages socket 24.

Figure 8 is a detail view of the curtain 5 in a folded position under the canopy top 2.

Figure 9 is a detail view of the socket 24 attached to the body 1.

The simplicity, neatness and advantage of this invention is mainly due to the fact that when installed and in folded position there are no unsightly posts either front, back or center, and no guide members or buttons to be manipulated to hold the complete full side-curtain in its effective position. With the exception of the inconspicuous socket 24 installed on the body of the car there is no external, visible evidence that there are any side-curtains for the touring car since the curtain and fastenings including the elastic spring member 8 which acts as a lock and post are all neatly folded under the canopy of the car. With this construction the passenger or driver, without leaving his seat and with one hand, can move the full side-curtain from its folded position to its operating position as a stormproof curtain by simply grasping the handle 10, thumb-tripping the catch 11—14 so as to release from the canopy hook 17, and letting the curtain fall to a vertical position where it is made secure by a knuckle joint action and by pressing the spring member 8 into a vertical position with the lower tip secured at 9 and the upper end secured by the means 11—13. The success of this full side-curtain depends on the novel selection and placement of the proper materials and structural elements which are incorporated in the curtain and fastenings for holding it rigid without end fastenings.

I claim:

For a vehicle having a body part and a canopy top, a side-curtain comprising an upper member and a lower member, a hinge connection between the upper member and the canopy top and a hinge connection between the two said members, an elastic bar connected to and forming a mechanically integral part of said lower member and adapted to normally serve as an alining post to hold the two said members in one plane when unfolded for use, releasable means to anchor the lower end of said bar on the vehicle body, and manually controlled means on said bar for locking said curtain in a folded position under and adjacent to the canopy.

In testimony whereof I affix my signature.

DAVID H. COLLIER.